US000001934H

(19) United States

(12) Statutory Invention Registration (10) Reg. No.: US H1934 H

Dautartas (43) Published: Jan. 2, 2001

(54) GOLD-TIN SOLDER SUITABLE FOR SELF-ALIGNING APPLICATIONS

(75) Inventor: Mindaugas Fernand Dautartas, Alburtis, PA (US)

(73) Assignee: Lucent Technologies, Inc., Murray Hill, NJ (US)

(21) Appl. No.: 08/539,491

(22) Filed: Oct. 6, 1995

Related U.S. Application Data

(63) Continuation-in-part of application No. 08/047,169, filed on Apr. 12, 1993, now abandoned, which is a continuation of application No. 07/877,335, filed on May 1, 1992, now abandoned.

(51) Int. Cl.[7] ..... C22C 5/02

(52) U.S. Cl. ..... 420/507; 148/430

(58) Field of Search ..... 148/430; 420/507

(56) References Cited

U.S. PATENT DOCUMENTS

| | | | | |
|---|---|---|---|---|
| 3,340,602 | * | 9/1967 | Hontz | 420/507 |
| 4,214,904 | * | 7/1980 | Kitchen et al. | 420/507 |
| 4,385,029 | * | 5/1983 | Desai | 420/507 |
| 4,670,217 | | 6/1987 | Henson et al. | 420/562 |
| 4,922,322 | | 5/1990 | Matthew | 357/69 |
| 5,066,614 | | 11/1991 | Dunaway et al. | 437/209 |

FOREIGN PATENT DOCUMENTS

| | | | | |
|---|---|---|---|---|
| 55-16525 | * | 2/1980 | (JP) | 420/507 |
| 0406673 | * | 11/1973 | (RU) | 420/507 |

OTHER PUBLICATIONS

Metals Handbook, vol. 8 pp. 269 and 347 8th id.*

* cited by examiner

*Primary Examiner*—Peter A. Nelson

(74) *Attorney, Agent, or Firm*—Wendy W. Koba

(57) ABSTRACT

A tin-rich gold-tin solder is disclosed which is particularly advantageous for self-aligning applications. When utilized with gold-plated bond locations, the out-diffusion of tin from the solder during heating functions to shift the composition of the remaining solder closer to the eutectic value, thus preserving the liquid state of the solder and improving its reflow quality with respect to conventional eutectic solders.

13 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GOLD-TIN SOLDER SUITABLE FOR SELF-ALIGNING APPLICATIONS

This application is a continuation of application Ser. No. 07/877,335, filed on May 1, 1992, which is a continuation-in-part of application Ser. No. 47,169, filed on Apr. 12, 1993, with both now abandoned.

BACKGROUND OF THE INVENTION

1. Technical Field

The present invention relates to a gold-tin solder and, more particularly, to a tin-rich, gold-tin solder.

2. Description of the Prior Art

Soldering is a well-known technique for securing metal piece parts in a permanent fashion. Solder material must have the capacity to form metallurgical bonds with the two base metals that are to be joined. The bonding process results in the formation of an alloy in the surface of the base metal characterized by atoms of the soldering composition interspersed between atoms of the base metal.

When the solder is heated to a molten state, it exists as a round droplet as a result of the attraction between the molecules forming the alloy. This attraction is commonly referred to as surface tension. For many technologically advanced applications, such as semiconductor and lightwave technologies, a solder composition of choice is a eutectic gold-tin material which is approximately 80% by weight gold and 20% by weight tin. The eutectic god-tin is often used in soldering components to gold (or gold-plated) bond pad sites.

In a conventional solder process, discrete portions, or preforms of the solder material are disposed or otherwise deposited (e.g., vapor deposition or silk screen paste )on a surface of one of the pieces to be mated (for example, to the bond pad site). The two pieces are joined and heated to a temperature where the solder liquifies (i.e., approximately 315° C. in a nitrogen ambient) and reflows over the mating surfaces to provide attachment upon cooling.

There are many known disadvantages to this procedure. First, the reproducibility of the reflow is questionable and sensitive to process variations, particularly since commonly available eutectic Au/Sn solder may only be guaranteed ±1% around the eutectic 80/20 composition. Additionally, the solid state diffusion of tin into an underlying gold bond pad will shift the preform composition to the gold-rich side of the eutectic and could result in poor reflow by raising the melting temperature of the resulting alloy.

In spite of the above drawbacks, however, Au/Sn remains the solder composition of choice since it is compatible with the materials (in particular, gold) used to plate most device surfaces.

Thus, a need remains in the art for some means of overcoming the various drawbacks associated with the eutectic Au/Sn solder.

SUMMARY OF THE INVENTION

The need remaining in the prior art is addressed by the present invention which relates to a gold-tin solder and, more particularly, to a gold-tin solder suitable for self-aligning applications.

In accordance with the teachings of the present invention, a tin-rich Au/Sn solder ($Au_{80-x}Sn_{20+x}$, $0<x\leqq 6$) is utilized, preferably in the range of 78/22 to 74/26 (weight % composition). Therefore, if solid state (or liquid state) diffusion of tin into a contacting gold plating layer occurs, the melt temperature will actually drop as the tin is depleted in the solder composition, until the eutectic composition is reached. The use of the tin-rich solder thus insures that the alloy will remain molten during solder reflow.

Further, the soldering process of the present invention may be optimized by heating the solder preform within a reducing ambient such that the further growth of any tin oxide on the surface of the preform (skin oxide) is significantly reduced.

An advantage of the solder composition of the present invention is that self-alignment of piece parts may be achieved. In particular, the utilization of a tin-rich solder allows for the solder to remain liquid and completely cover (i.e., "wet") both bonding surfaces. Therefore, by controlling the size and location of the bonding surfaces, the liquification of the tin-rich solder will result, through surface tension effects, in registration (i.e., centering) of the device with respect to the underlying bond pad.

Other advantages of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

Figure 1:
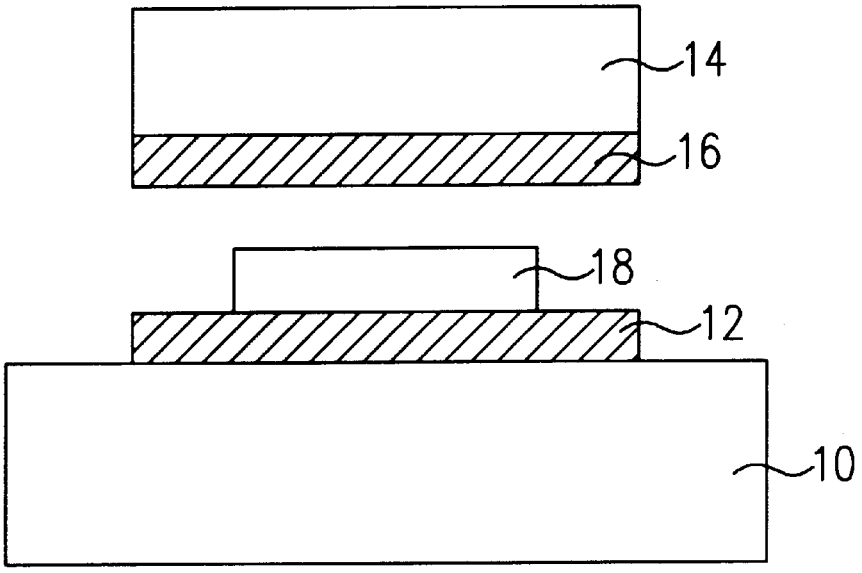
FIGS. 1–3 illustrate an exemplary sequence of steps utilized to provide self-aligned solder attachment in accordance with the teachings of the present invention.
Figure 2:
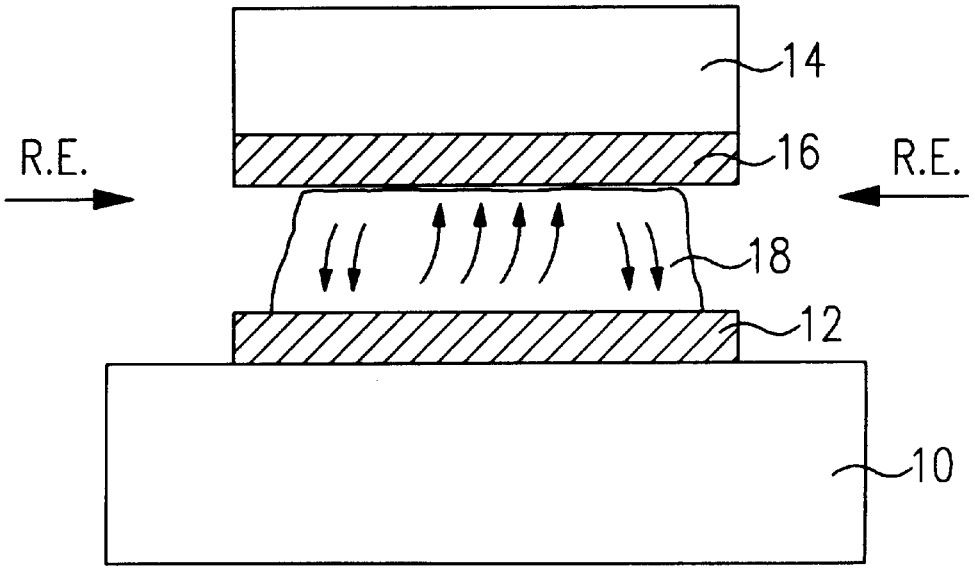
Figure 3:
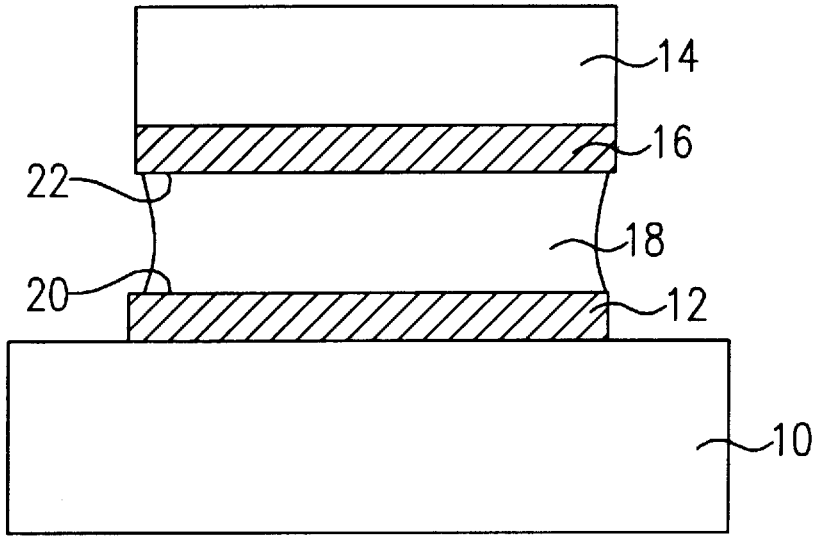

An exemplary process for providing self-aligned solder attachment of a pair of components is illustrated in FIGS. 1–3. The inventive bonding process will be particularly described in association with the self-aligned attachment of an LED to a bond pad. However, it is to be understood that the tin-rich solder of the present invention is ubiquitous in nature and can be utilized within virtually any desired soldering process. Referring back to FIG. 1, a device submount 10, which may be formed of silicon, is illustrated as including a bond pad 12. Conventionally, bond pad 12 is formed of a highly conductive material and, in particular, may comprise a tri-layer structure of titanium, platinum and gold. Gold, in general, is often used for bond pads due to its inert nature and relatively high conductivity. A device 14, such as an LED, is illustrated in FIG. 1 as positioned above bond pad 12. Device 14 also includes a conductive layer 16 (which may also comprise a tri-level, or gold plated layer) to facilitate bonding. In order to provide alignment of device 14 to submount 10, conductive layer 16 should be substantially similar in dimension to bond pad 12.

Figure 5:
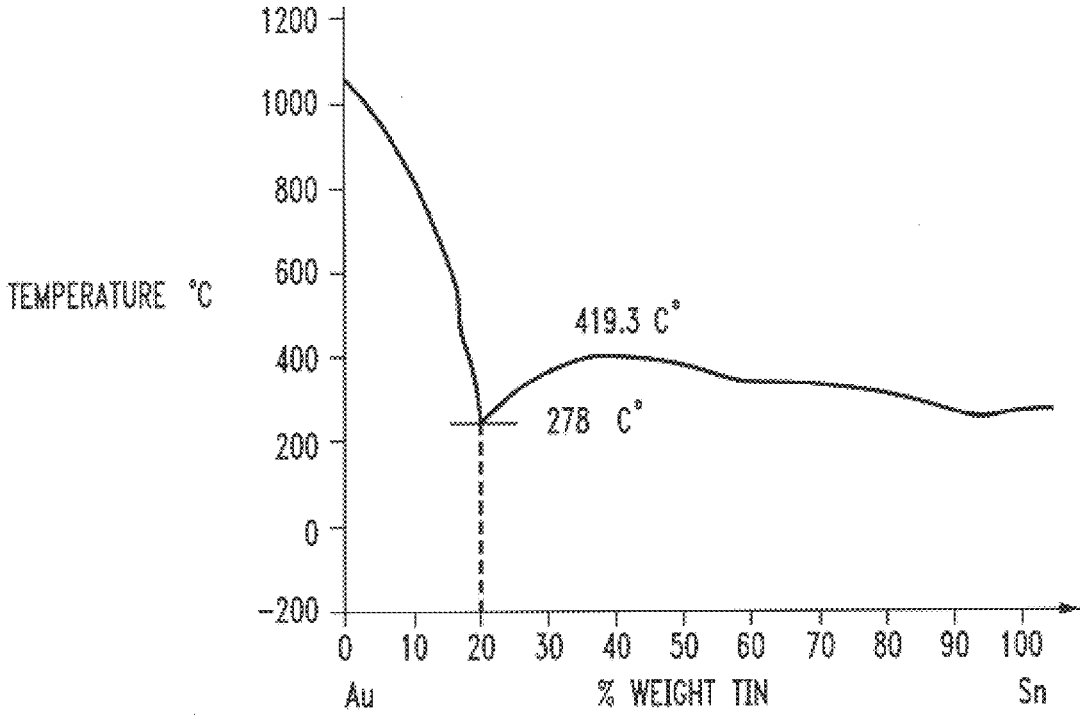
FIG. 5 contains a Au/Sn phase diagram useful in understanding the process of the present invention.

Bonding is achieved, in accordance with the present invention, by utilizing a tin-rich (with respect to the eutectic 80/20) Au/Sn solder preform 18 which is disposed over and brought into contact with bond pad 12. Initially, solder preform 18 may comprise a solid compound, and exhibit a weight percent composition within the range of, for example, 74/26 to 78/22. To initiate bonding, as shown in FIG. 2, device 14 is brought into contact with solder preform 18 and the combination is heated to a temperature (for example, 400° C.) at which the tin-rich solder will liquify. As the ambient temperature increases, the rate of solid state diffusion of the tin out of solder 18 and into gold layers 12 and 16 will increase, as indicated by the arrows in FIG. 2. The solid state diffusion is also known to occur with the conventional eutectic solder. In particular, problems arise when utilizing the prior art eutectic in that as the tin diffuses out, the solder becomes gold-rich, and the temperature required for liquifying the solder raises. FIG. 5 contains a Au/Sn phase diagram illustrating the effect of the composition on the phase state of the material. Thus, when soldering at the temperature associated with a "eutectic" solder (e.g., 278° C.), a portion of the solder will remain in the solid state and will not completely coat (i.e., "wet") the underlying bond pad.

In contrast, when utilizing the tin-rich solder of the present invention, the solid state diffusion of tin from solder preform 18 into bond pad 12 and contact layer 16 results in moving the composition closer to the eutectic, as indicated by the arrow in FIG. 5. That is, as the tin is depleted, the temperature required for liquifying the solder actually drops (following along the line from 419.3° C. toward the limit of 278° C.), and essentially all of the solder will remain in the liquid state. FIG. 3 illustrates the relative location of device 14 with respect to the liquified solder preform 18. As shown, when completely liquified, solder 18 will completely cover the top surfaces 20,22 of bond pad 12 and conductive layer 16, respectfully. The surface tension created at the outer bound of solder 18 will cause device 14 to center itself, thus resulting in device 14 to be self-aligned with respect to the underlying bond pad 12.

It is known that the soldering operation such as that discussed above will cause a tin oxide layer to form (or an existing layer to increase) at the outer surface of solder 18. The presence of this oxide may necessarily affect the solder reflow. Thus, in the preferred technique of the present invention, the heating step is performed in a reducing ambient which inhibits the formation of this oxide. For example, formic acid may be used to prevent tin oxide formation. Other reducing environments (indicated as "R.E." in FIG. 2) include, but are not limited to, forming gas (20%$H_2$/80%$N_2$), carbon monoxide, or any suitable liquid flux.

Figure 4:
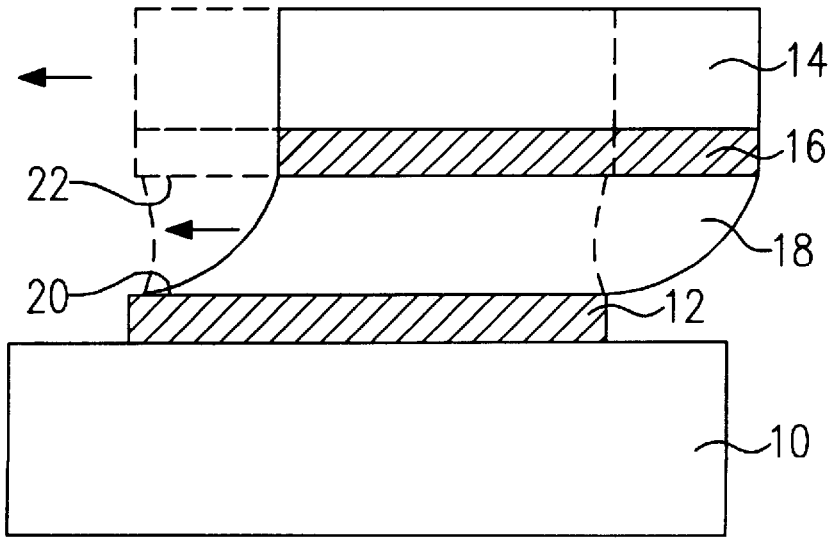
FIG. 4 illustrates in particular the self-aligning ability of the system of the present invention.

As mentioned above, an advantage of utilizing the tin-rich solder of the present invention is the ability to provide automatic alignment of a device to an underlying bond pad. Referring to FIG. 3 in particular, the tin-rich solder allows for a device 14 to be aligned with bond pad 12. The coverage of liquified solder 18 with respect to surfaces 20 and 22 of bond areas results in alignment since the solder material will naturally move so as to reduce its overall surface area. Reference is made to FIG. 4 which illustrates a device 14' offset with respect to the underlying bond pad 12. As shown, liquified solder 18 will exhibit an increased surface area with respect to a minimum, as a function of the amount of offset. Thus, the liquified solder will naturally move, in the direction as indicated by the arrows, so as to minimize the surface area. The natural tendency of the solder movement thus results in alignment of the device to the bond pad. Experimentally, it has been found that misalignment on the order of 100 $\mu$m can be corrected to within a one $\mu$m limit.

Figure 6:
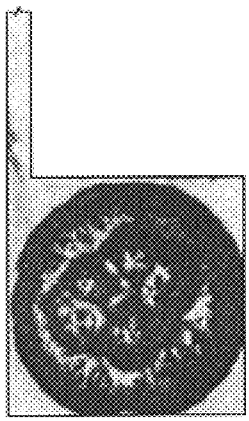
FIG. 6 contains an optically-scanned, computer-generated image of a photograph of bond pad coverage when utilizing a conventional prior art eutectic Au/Sn solder.
Figure 7:
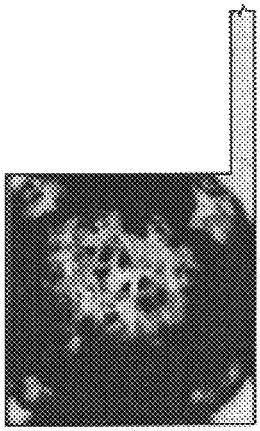
FIG. 7 contains an optically-scanned, computer-generated image of a photograph of improved bond pad coverage when utilizing an exemplary tin-rich Au/Sn solder of the present invention.

FIGS. 6 and 7 contain top views of actual bond pad sites including a reflowed solder preform (original preform being circular in shape). Both figures are optically-scanned, computer-generated images taken from actual color photographs. The bond pad of FIG. 6 contains a conventional eutectic 80/20 Au/Sn solder after reflow. As shown, the solder does not completely coat the surface of the bond pad. As discussed above, the out-diffusion of tin into the bond pad results in a gold-rich solder which does not completely liquify and, hence, has poor reflow qualities. In contrast, the bond pad of FIG. 7 contains a tin-rich (76/24) solder of the present invention. As shown, essentially all of the bond pad surface has been coated with the reflowed material.

Advantageously, the utilization of a tin-rich solder in accordance with the present invention results in a significant manufacturing achievement. In particular, by virtue of using a tin-rich solder, a bonding hierarchy may be employed, without the need of first employing a soldering hierarchy. That is, as one proceeds through sequential bonding operations, all using the same solder and bonding compositions, previous bonds will not be disturbed (i.e., reflow).

As long as the component and/or substrate is conventionally metallized (with Ti/Pt/Au or Ti/Ni/Au, for example), the utilization of the tin-rich solder of the present invention results in the intermetallic compound formation of Pt with Sn (when using Ti/Pt/Au) as well as interdiffusion of Sn into the Au metallization. Both of these processes result in significantly raising the melt temperature of the resultant bond, to above 400° C., for example.

Therefore, when the next component is bonded, using the tin-rich solder again, at a nominal temperature of 315° C., the first component will remain fixed, since bonding was carried out at a temperature well below the melt temperature. The process may be repeated time and again, without disturbing any of the previously-formed bonds. Such an advantage, realized by using the tin-rich solder compound of the present invention, is especially critical in optical applications, where alignment of bonded components cannot be subjected to movement subsequent to bonding.

It is to be understood that the arrangement described above is exemplary only, and the tin-rich Au/Sn solder of the present invention is applicable to any system which requires the soldering of a component to a gold, or gold-plated bond pad.

What is claimed is:

1. An article of manufacture including a device with a conductive surface bonded to a gold-plated submount by a solder consisting essentially of 74–78% by weight gold and 26–22% by weight tin, wherein said submount is gold-plated so as to define a bond pad, said conductive surface bonded directly to said bond pad such that the solder completely covers said bond pad and said device is aligned with the bond pad.

2. An article of manufacture as defined in claim 1 wherein the conductive surface of the device is gold.

3. An article of manufacture as defined in claim 1 wherein the device is a light emitting diode.

4. An article of manufacture as defined in claim 1 wherein the submount is silicon.

5. An article of manufacture including a device with a conductive surface bonded to a submount by a solder consisting essentially of 74–78% by weight gold and 26–22% by weight tin, wherein the submount includes a layer of/titanium plated to said submount surface and a layer of platinum plated to said titanium layer, and a layer of gold plated to said platinum layer so as to define a bond pad, said conductive surface bonded directly to said bond pad such that the solder completely covers said bond pad and said device is aligned with the bond pad.

6. A method of soldering a first component to a second component so as to form a self-alignment of said first component to said second component, the self-alignment method comprising the steps of:

a) providing a first component and a second component, each component including a surface layer of gold;

b) disposing a Au/Sn solder of the composition $Au_{80-x}An_{20+x}$, $0<x\leqq 6$, between the gold surface layers, c) contacting the first and second components such that the Au/Sn solder is in physical contact with both gold surface layers; and d) heating the combination to a temperature sufficient to liquify the Au/Sn solder and result in the self-alignment of said first component to said second component.

7. The method of claim 6 wherein in performing step b), $2<x\leqq 4$.

8. The method of claim 6 wherein in performing step d), the combination is heated to a temperature in excess of 280° C.

9. A method of sequentially bonding a plurality of components to a substrate, the method comprising the steps of:

a) providing a substrate including a plurality of conventional metallized locations for subsequent placement of components;

b) providing a component including an exposed surface region covered with a tin-rich Au/Sn solder compound, wherein tin-rich is defined as $Au_{80-x}Sn_{20+x}$, $0<x\leqq 6$, c) aligning said component with a predetermined metallized location;

d) heating the combination of said component and said predetermined metallized location to a conventional bonding temperature so as to form a bond with a reflow temperature greater than said conventional bonding temperature; and e) repeating steps b) through d) for each component of the plurality of components, wherein utilization of said tin-rich Au/Sn solder significantly raises the resultant bond reflow temperature so as to prevent reflow of previously formed bonds.

10. The method as defined in claim 9 wherein in performing step d), the conventional bond temperature is approximately 315° C.

11. The method as defined in claim 9 wherein in performing step d), the reflow temperature exceeds 400° C.

12. The method as defined in claim 9 wherein in performing step a), the conventional metallization comprises Ti/Pt/Au.

13. The method as defined in claim 9 wherein in performing step a), the conventional metallization comprises Ti/Ni/Au.

* * * * *